United States Patent [19]

LaVelle

[11] Patent Number: 5,058,790
[45] Date of Patent: Oct. 22, 1991

[54] SEAT-MOUNTED CLOTHING VALET

[76] Inventor: Thomas P. LaVelle, 648 W. Oakdale, Suite 2R, Chicago, Ill. 60657

[21] Appl. No.: 547,855

[22] Filed: Jul. 2, 1990

Related U.S. Application Data

[63] Continuation-in-part of Ser. No. 380,084, Jul. 13, 1989, abandoned, which is a continuation of Ser. No. 126,243, Nov. 27, 1987, abandoned.

[51] Int. Cl.$^5$ .................... B60R 7/04; A47C 7/64
[52] U.S. Cl. .................... 224/275; 224/42.045 A; 224/42.046 A; 224/313; 223/88; 297/190; 211/112; 248/231.8
[58] Field of Search ............... 224/273, 275, 311, 313, 224/42.45 R, 42.45 A, 42.46 R, 42.46 A, 42.42; 223/88; 297/180, 188, 191; 211/106, 112, 113, 119; 248/231.8, 225.31

[56] References Cited

U.S. PATENT DOCUMENTS

| | | | |
|---|---|---|---|
| D. 156,691 | 1/1950 | Belmont | 297/190 |
| 2,255,973 | 9/1941 | Hoobler | 224/42.45 A |
| 2,510,244 | 6/1950 | Moltrup | 224/42.45 A |
| 2,582,650 | 1/1952 | Patton | 224/275 |
| 2,583,806 | 1/1952 | Batzle | 224/42.45 A |
| 2,591,381 | 4/1952 | Scott-Dalgleish | 297/190 |
| 2,947,457 | 8/1960 | Lentz | 224/42.45 A |
| 3,708,093 | 1/1973 | Toms, II | 224/42.45 A |
| 3,907,118 | 9/1975 | Pelavin | 211/113 |
| 3,920,211 | 11/1975 | Knight | 224/275 |
| 4,957,230 | 9/1990 | Gonzales | 224/42.46 A |

Primary Examiner—Ernest G. Cusick
Attorney, Agent, or Firm—Patula & Associates

[57] ABSTRACT

A seat-mounted clothing valet apparatus having an S-shaped or T-shaped bracket supported by and depended from the upper portion of a seat. The support extends rearwardly from the seat and is fracturable upon impact. The valet is adaptable to support clothing and depends from the elongated support. The apparatus may be supported by the headrest or headrest supports of a vehicle seat and may be formed integrally.

28 Claims, 3 Drawing Sheets

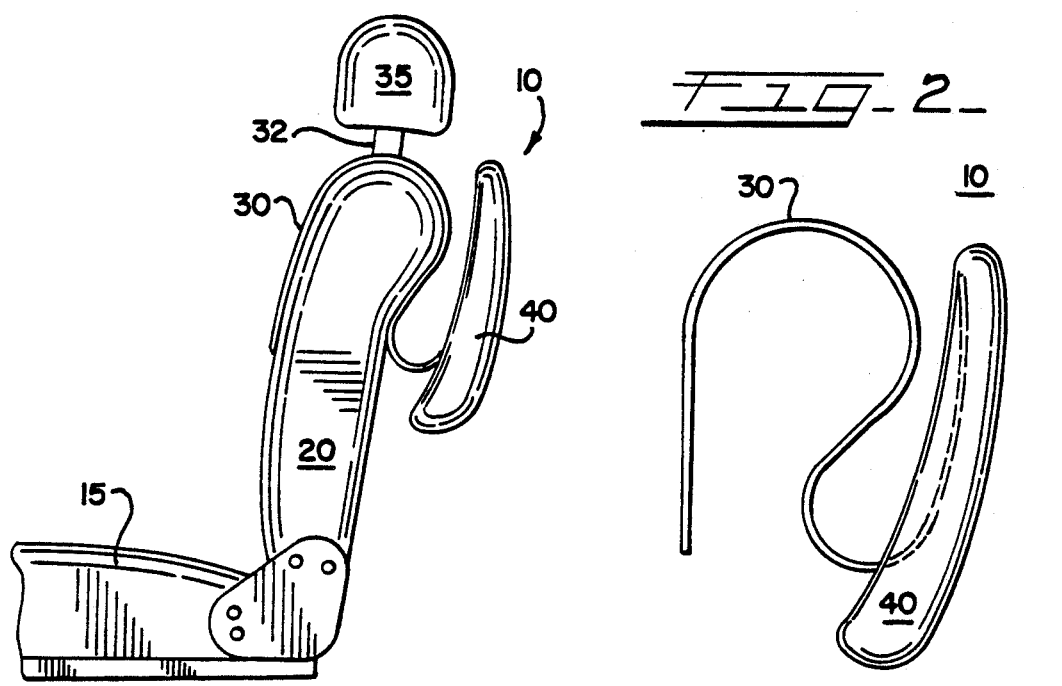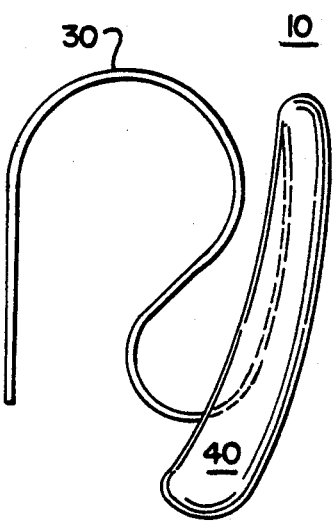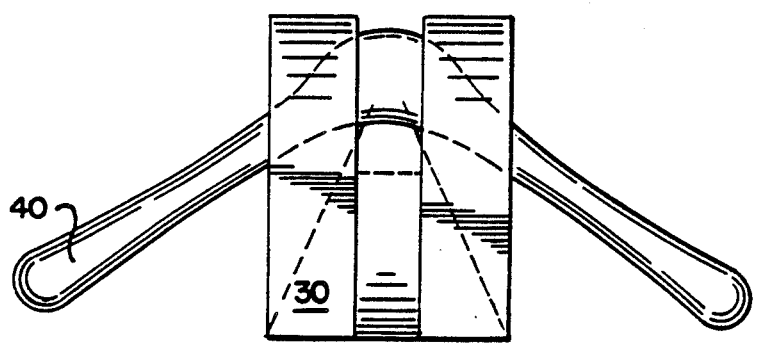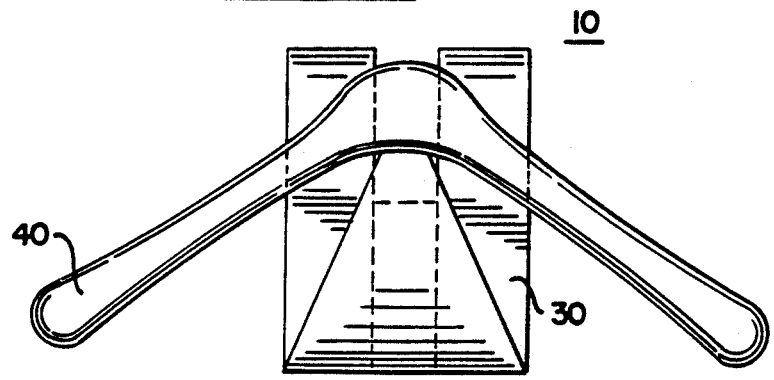

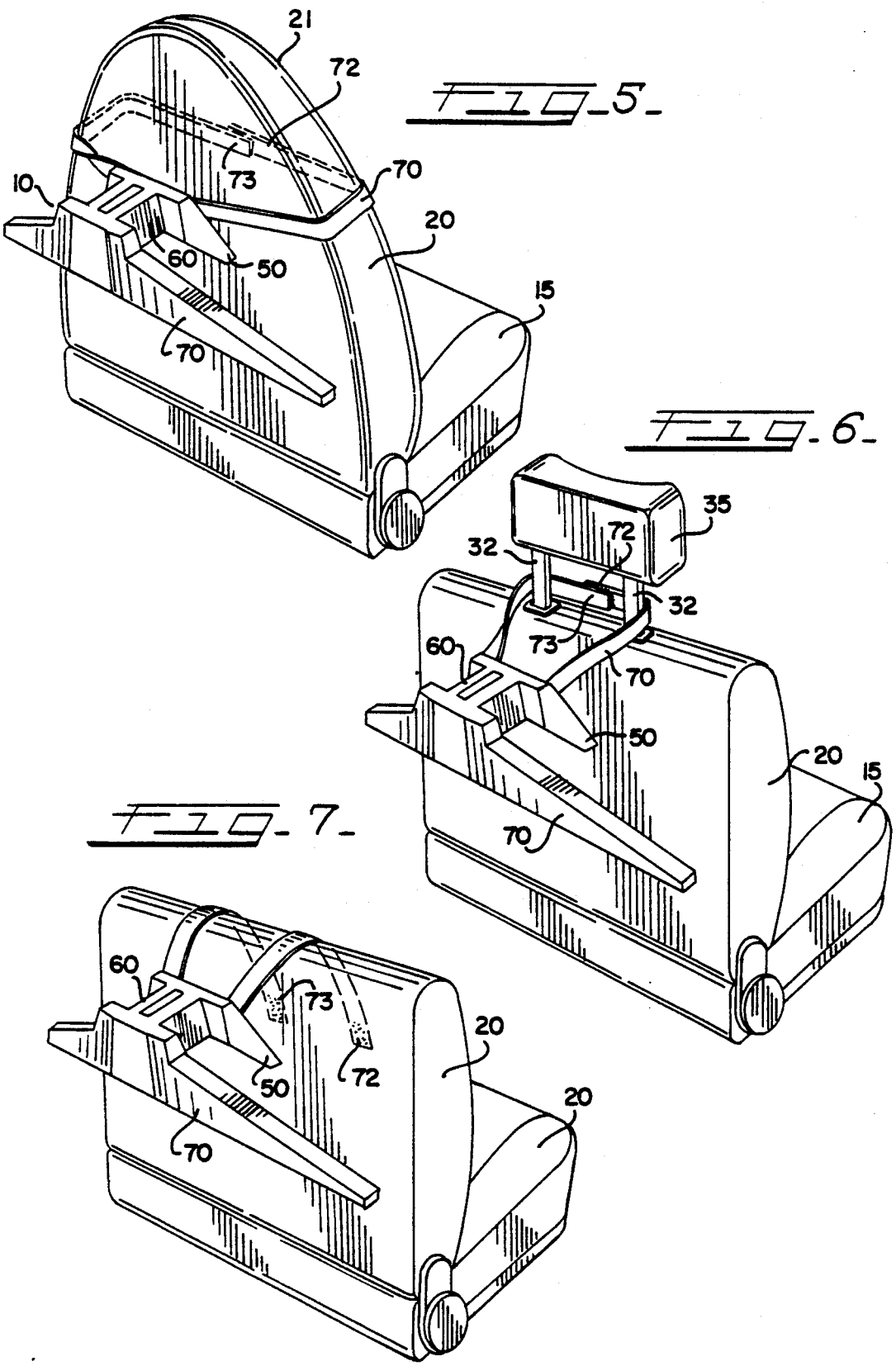

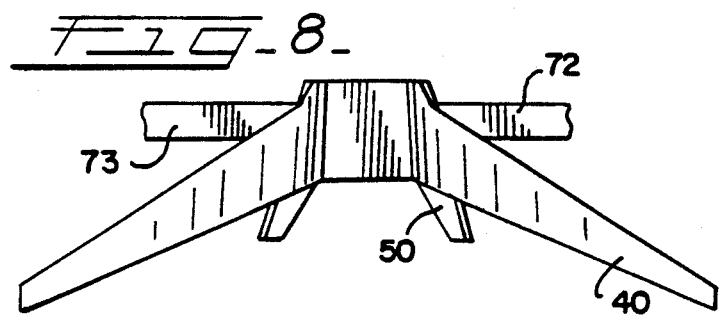
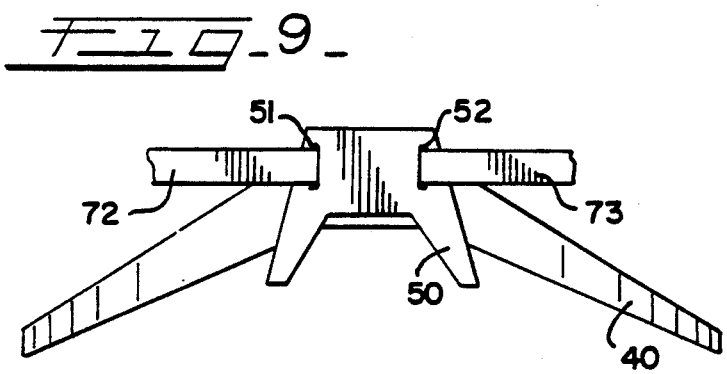
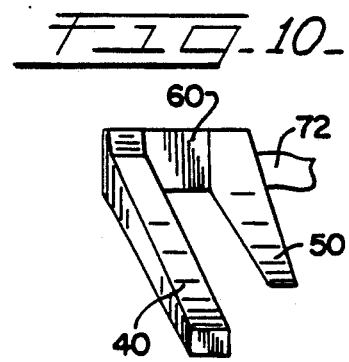
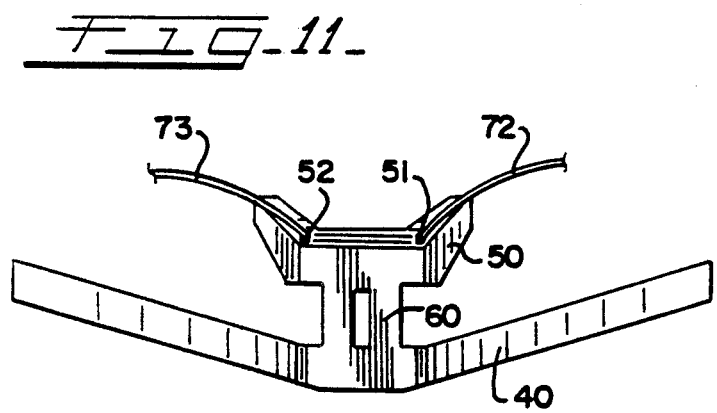
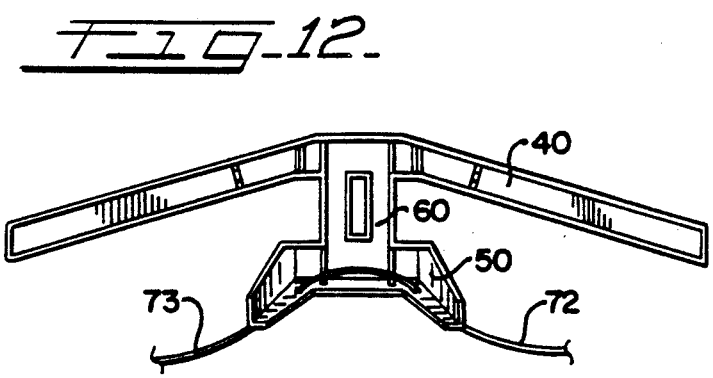

SEAT-MOUNTED CLOTHING VALET

CROSS-REFERENCE TO RELATED APPLICATIONS

This application is a continuation-in-part of co-pending application Ser. No. 07/380,084, filed July 13, 1989, which is a continuation of application 07/126,243, filed Nov. 27, 1987 both abandoned. The invention relates generally to a seat-mounted clothing valet to suspend a garment rearward from a seat backrest.

BACKGROUND OF THE INVENTION

In the past, numerous inventions were developed for supporting articles in automobiles. Knight U.S. Pat. No. 3,920,211 supported a lunch box from the backrest of an automobile seat. Complicated and cumbersome inventions such as those shown in Lentz and Moltrop U.S. Pat. Nos. 2,947,457 and 2,510,244, respectively, were developed to support garments in automobiles. Unfortunately, their use restricted the use of other parts of the automobile such as the seat portion or the seat directly behind. The invention disclosed in Hoobler U.S. Pat. No. 2,255,973 is cumbersome to use in that it blocks the rear view of the driver and does not provide adequate support for a garment nor prevent the garment from becoming dislodged from the apparatus. The invention disclosed in Patton U.S. Pat. No. 2,582,650 is limited in its design and utility for adaptability to vehicle seat of varied shape and style.

The present invention obviates the problems and shortcomings of the prior art by providing a simple, easily adaptable seat-mounted clothing valet, which, by having the disclosed supporting apparatus shown, the wrinkling and soiling of the garment is prevented without restricting the availability for use of the seat behind or blocking the driver's or passenger's vision.

The primary object of the present invention is a seat-mounted clothing valet used to hold clothing wrinkle free in an easily accessible location.

It is another object of the present invention to be used in automobiles and specifically either bench or bucket seats. The present invention when used in an automobile will not interfere with the backseat passenger's use of the backseat and may be used even if there is no rear seat.

It is another object of the present invention to be mounted in a vehicle such that passenger's or driver's view through rear or side windows is unobstructed.

It is yet another object of the present invention that the valet be readily attached or removed without the use of tools.

It is yet another object of the present invention to be adaptable to home and office furniture, and to seat backs or headrests of varied style, size or shape.

It is yet another object of the present invention to be compact in size so as to be stored in a vehicle trunk or desk drawer when not in use.

It is yet another object of the present invention to be manufactured of a fracturable material so as to fracture upon impact at a desired location for safety.

Another object of the present invention is to be manufactured of a resilient material so as to give upon impact for safety.

It is yet another object of the present invention to be adaptable to the top of a door in a home or office.

Numerous other advantages and features of the invention will become apparent from the detailed description of the invention, from the claims, and from the accompanying drawings, in which like numerals are employed to designate like parts throughout the same.

SUMMARY OF THE INVENTION

The present invention is comprised of an elongated support adapted at one end to receive and support clothing typically in the form of a clothes hanger. The other end of the elongated support is adapted to be supported by the upper portion of a seat and directed rearwardly from the back of the seat. The elongated support gives upon impact for safety. The present invention may also be supported by the headrest pole or support of an automobile seat and may even be used on chairs or on the top of doors in homes and offices.

More specifically, the present invention is an apparatus for hanging clothing, such as coats, shirts, or the like, from the backrest of a car seat, such that the clothing does not obstruct the rear view of a person sitting in the seat, while allowing a major portion of the clothing to be draped vertically from the apparatus and positioned away from and behind the seat, the backrest of the seat defining a backrest plane.

The clothes hanging apparatus includes a hanger for draping and supporting clothing in a substantially vertical plane and in a substantially wrinkle-free condition, the hanger having at least two opposite wing members extending outwardly and downwardly from a base member, the outer ends of the two wing members defining a hanger line.

The apparatus further includes a bracket for supporting the hanger behind and not significantly above the top of the backrest and at a sufficient distance from the backrest such that the backrest does not normally touch clothing draped on the hanger, the bracket having a first end fixedly attached to the base member, the bracket having a second end adapted to be removably attached to the upper rear portion of the backrest, the bracket defining a substantially planar portion disposed parallel to the hanger line and parallel to the backrest plane, the planar portion being of sufficient width to provide suitable lateral stability for the hanger to maintain the hanger line below the top of the backrest and in a parallel orientation to the backrest plane when clothing is draped n the hanger, the bracket being constructed from fracturable material so as to break apart upon impact, thus ensuring passenger safety.

BRIEF DESCRIPTION OF THE DRAWINGS

A fuller understanding of the present invention may be had by reference to the accompanying drawings wherein:

FIG. 1 is a side perspective view of a first embodiment of the seat-mounted clothing valet of the present invention positioned on a vehicle seat;

FIG. 2 is a side view of the embodiment shown in FIG. 1;

FIG. 3 is a front view of the embodiment shown in FIG. 1; and

FIG. 4 is a back view of the embodiment shown in FIG. 1;

FIG. 5 is a rear perspective view of a second embodiment of the seat-mounted clothing valet of the present invention being positioned on and strapped around a vehicle seat;

FIG. 6 is a rear perspective view of the seat-mounted clothing valet of FIG. 5 positioned as shown depended from the headrest of a vehicle seat;

FIG. 7 is a rear perspective view of the second embodiment positioned on a vehicle seat by conventional fastening mechanism such as hook and eye attachments commonly referred to as "Velcro";

FIG. 8 is a rear view of the embodiment shown in FIGS. 5 through 7;

FIG. 9 is a front view of the embodiment shown in FIGS. 5 through 7;

FIG. 10 is a top view of the seat-mounted clothing valet shown in FIGS. 5 through 7;

FIG. 11 is a bottom view of the second embodiment; and

FIG. 12 shows a side view of the same embodiment.

DETAILED DESCRIPTION THE INVENTION

While this invention is susceptible of embodiment in many different forms, there is shown in the drawings and will be described herein in detail, two embodiments of the invention. It should be understood, however, that the present embodiments are to be considered only exemplifications of the principles of the invention and are not intended to limit the spirit and scope of the invention and/or claims.

Referring now to FIG. 1, which is a first embodiment of the invention, depicted is a side view of the seat-mounted clothing valet generally identified by the numeral 10 on the backrest 20 of an automobile seat 15, and proximate headrest supports 32 below headrest 35. A bracket 30, having at least a portion being comprised of a substantially S-shaped bar comprised of two connected U-shaped segments, is positioned to be supported over the upper portion of backrest 20. The bracket 30 has a first inverted U-shaped segment which is adapted to be removably attached to and positioned over the top of the backrest, and has a second upright U-shaped segment which is adapted to support a hanger 25, similar to a conventional coat hanger, which is affixed to the bar. The bracket positions the hanger 25 behind and at a distance from the backrest 20, such that the backrest does not normally touch clothing draped on the hanger.

FIGS. 2 through 4 depict side, front, and back views of the seat-mounted clothing valet 10 including elongated bar support 30 and hanger 25. Note the bifurcated construction at the forward end of the elongated bar 30, shown in FIGS. 3 and 4, which permit the valet 10 to be used on a seat having one or more headrest supports 32.

FIG. 5 depicts a second embodiment of the invention, showing a rear perspective view of the seat-mounted clothing valet generally identified by the numeral 10' on the backrest 20 of an automobile seat 15, supported by mount strap 40. FIG. 6 depicts a rear perspective view of the valet 10' depended from headrest supports 32 of headrest 35 by mount strap 40. Mount strap 40 has a strap end 42 and a strap end 43, which strap ends are releasably engaged to one another by conventional fastening mechanism such as the hook and fastener type commonly referred to as "Velcro" or by other conventional fastening mechanism such a buckling, buttoning, snapping, or tying. Strap end 42 is threaded through anchor 50 and pulled around to the front face 21 of backrest 20 for engagement with strap end 43, with the hanger 25 of valet 10' positioned at the rear 22 of the backrest 20.

Hanger member 25 is affixed to distance support 60 which is affixed to anchor 50. Distance support 60 and anchor 50 comprise the bracket mechanism for supporting the hanger 25 behind the backrest and at a distance from the backrest. In this embodiment, the bracket is substantially T-shaped, wherein the anchor 50 serves as a top segment of the T-shaped bracket, which is adapted to be removably attached to the upper back portion of the backrest, and wherein the distance support 60 serves as a root segment of the T-shaped bracket, which is fixedly attached to and adapted to support the hanger behind and at a distance from the backrest such that the backrest does not normally touch clothing draped on the hanger.

FIG. 7 depicts a rear perspective view of the seat-mounted clothing valet 10', distance support 60 and hanger 25 depended from mount strap 40 with strap ends 42 and 43 unconnected and mounted directly on front face 21 of backrest 20 using a conventional fastening mechanism.

FIGS. 5 through 7 also show the valet 10' held in place at the back face 22 of backrest 20 by wing supports 53 and 54 of anchor 50, which wing supports 53 and 54 angularly project away from distance support 60 and into back face 22 for anchoring the valet 10' against the backrest 20.

FIGS. 8 through 12 again show the second embodiment of the invention, depicting the valet 10' from rear, front, top, bottom, and side views, respectively. These views more clearly illustrate how mount strap 40 is threaded through the two slots 51, 52 in anchor 50. The downward angles of the ends of hanger 25, and the forward angles of wing supports 53, 54, are also more apparent in these views.

In the embodiment of the invention depicted in FIGS. 1 through 3, the elongated bar 30 is placed over the upper portion of backrest 20, as shown in FIG. 1, or over headrest 35, (not shown). The user places his or her garment on the hanger 25 in the conventional fashion before being seated on the seat 15. The garment (not shown) will be kept from wrinkling and being soiled by being supported directly behind the wearer's seat 15. The positioning of the garment on the hanger 25 should not interfere with the use of the rear seat in a vehicle nor obstruct the vehicle's windows. This embodiment of the present invention may also be adaptable to being supported from the headrest supports 32. The present invention may also be configured with multiple hangers 25.

The embodiment of the present invention shown in FIGS. 1 through 4 may also be adaptable for use in homes and offices by adapting elongated bar 30 to fit over the top of a door for support (not shown).

In the embodiment of the invention depicted in FIGS. 5 through 12, the clothing valet is strapped around the upper portion or backrest 20 of seat 15, as shown in FIG. 5, or around headrest 35, as shown in FIG. 6. The user places his or her garment on the hanger 25 in the conventional fashion before being seated on the seat 15. The garment (not shown) will be kept from wrinkling and being soiled by being supported directly behind the wearer's seat 15. The positioning of the garment on the hanger 25 should not interface with the use of the rear seat in a vehicle nor obstruct the vehicle's windows. This embodiment of the present invention may also be configured with multiple hangers 25.

Additionally, this embodiment of the present invention may be adaptable for use in homes and offices by mounting the strap ends 42 and 43 of the valet 10' over the top of a door for support (not shown), analogous to the mount mechanism shown in FIGS. 6 and 7.

At least the bracket mechanism portion of both of the embodiments is preferably constructed from a fracturable material so as to fracture upon impact at a desired location for safety. The valet may alternatively be manufactured of a resilient material so as to give upon impact for safety.

While specific embodiments of the present invention have been shown and described herein, further modifications and improvements may be made without departing from the invention in its broader aspects. For example, the bracket can be adapted for use on different types of backrests for various types of seats in homes and offices. All such modifications which retain the basic underlying principles disclosed and claimed herein are within the scope of this invention.

What is claimed is:

1. A clothing valet particularly adapted for hanging one or more garments behind the backrest of an automobile seat, said clothing valet comprising:
   hanger means for draping and supporting clothing in a substantially vertical plane and in a substantially wrinkle-free condition, said hanger means having a base member and two wing members extending outwardly from and centrally supported by said base member; and
   bracket means for supporting said hanger means behind said backrest and at a distance from said backrest, at least a portion of said bracket means being substantially S-shaped, wherein a first inverted U-shaped segment of said bracket means is adapted to be removably attached to and positioned over the top of said backrest, and wherein a second upright U-shaped segment of said bracket means is fixedly attached to said base member and adapted to support said hanger means behind and at a distance from said backrest, such that said backrest does not normally touch clothing draped on said hanger means.

2. The clothing valet according to claim 1, wherein the outermost ends of said two wing members of said hanger means extend slightly downward from said base portion.

3. The clothing valet according to claim 1, wherein said bracket means is constructed such that said hanger means is adapted to be disposed no higher than the top of said backrest when affixed to said automobile sat, thereby preventing garments draped on said hanger means from blocking the driver's view.

4. The clothing valet according to claim 1, wherein said bracket means is fracturable upon impact.

5. The clothing valet according to claim 1, wherein said bracket means is resilient upon impact.

6. The clothing valet according to claim 1, wherein said bracket means includes a first end fixedly attached to said base portion, and further includes a second end having a bifurcated construction and adapted to be removably attached to the upper portion of a backrest having a headrest disposed thereon.

7. A clothing valet particularly adapted for hanging one or more garments behind the backrest of an automobile seat, said clothing valet comprising:
   hanger means for draping and supporting clothing in a substantially vertical plane and in a substantially wrinkle-free condition, said hanger means having a base member and two wing members extending outwardly from and centrally supported by said base member;
   bracket means for supporting said hanger means behind said backrest and at a distance from said backrest, at least a portion of said bracket means being substantially T-shaped, wherein a top segment of said bracket means is adapted to be removably attached to the upper back portion of said backrest, and wherein a root segment of said bracket means is fixedly attached to said base member and adapted to support said hanger means behind and at a distance from said backrest, such that said backrest does not normally touch clothing draped on said hanger means; and
   strap means for removably attaching said top segment of said bracket means to the upper back portion of said backrest.

8. The clothing valet according to claim 7, wherein the outermost ends of said two wing members of said hanger means extend slightly downward from said base portion.

9. The clothing valet according to claim 7, wherein said bracket means is constructed such that said hanger means is adapted to be disposed no higher than the top of said backrest when affixed to said automobile seat, thereby preventing garments draped on said hanger means from blocking the driver's view.

10. The clothing valet according to claim 7, wherein said bracket means is fracturable upon impact.

11. The clothing valet according to claim 7, wherein said bracket means is resilient upon impact.

12. The clothing valet according to claim 7, wherein said top segment of said T-shaped bracket means is adapted to be positioned flush against the rear surface of the upper portion of the backrest of the seat.

13. The clothing valet according to claim 7, wherein said top segment of said T-shaped bracket means includes a plurality of slots through which said strap means is threaded.

14. The clothing valet according to claim 7, wherein said strap means includes fastener means for removably attaching said strap means to said backrest.

15. The clothing valet according to claim 14, wherein said top segment of said bracket means is adapted to be removably attached to the upper back portion of said backrest by positioning said strap means over the top of said backrest and fastening said strap means to the front side of said backrest.

16. The clothing valet according to claim 14 wherein said top segment of said bracket mean is adapted to be removably attached to the upper back portion of said backrest by positioning said strap means around the sides of said backrest and fastening said strap means together at the front side of said backrest.

17. The clothing valet according to claim 14, wherein said backrest includes a headrest supported on the top of said backrest with a headrest support mechanism, and wherein said top segment of said bracket means is adapted to be removably attached to the upper back portion of said backrest by fastening said strap means to said headrest support mechanism.

18. An apparatus for hanging clothing, such as coats, shirts, or the like, from the backrest of a car seat, such that the clothing does not obstruct the rear view of a person sitting in the seat, while allowing a major portion of the clothing to be draped vertically from the apparatus and positioned away from and behind the seat, the backrest of the seat defining a backrest plan, the apparatus comprising:

hanger means for draping and supporting clothing in a substantially vertical plane and in a substantially wrinkle-free condition, said hanger means having at least two opposite wing members extending outwardly and downwardly from a base member, the outer ends of said two wing members defining a hanger line; and bracket means for supporting said hanger means behind and not significantly above the top of said backrest and at a sufficient distance from said backrest such that said backrest does not normally touch clothing draped on said hanger means, said bracket means having a first end fixedly attached to said base member, said bracket means having a second end adapted to be removably attached to the upper rear portion of said backrest, said bracket means defining a substantially planar portion disposed parallel to said hanger line and parallel to said backrest plane, said planar portion being of sufficient width to provide suitable lateral stability for said hanger means to maintain said hanger line below the top of said backrest and in a parallel orientation to said backrest plane when clothing is draped on said hanger means, said bracket means being constructed fracturably so as to break apart upon impact, thus ensuring passenger safety.

19. The apparatus according to claim 18, wherein at least a portion of said bracket means has a substantially S-shaped cross-section, wherein a first inverted U-shaped segment of said bracket means defines said planar portion and is adapted to be removably attached to and positioned over the top of said backrest, and wherein a second upright U-shaped segment of said bracket means is fixedly attached to said base member and adapted to support said hanger means behind and at a distance from said backrest, such that said backrest does not normally touch clothing draped on said hanger means.

20. The apparatus according to claim 18, wherein said bracket means has a substantially T-shaped cross-section, wherein a top segment of said bracket means defines said planar portion and is adapted to be removably attached to the upper back portion of said backrest, and wherein a root segment of said bracket means is fixedly attached to said base member and adapted to support said hanger means behind and at a distance from said backrest, such that said backrest does not normally touch clothing draped on said hanger means.

21. The apparatus according to claim 18, further comprising strap means for removably attaching said planar portion of said bracket means to the upper back portion of said backrest.

22. The apparatus according to claim 21, wherein said planar portion of said bracket means includes a plurality of slots through which said strap means is threaded.

23. The apparatus according to claim 21, wherein said strap means includes fastener means for removably attaching said strap means to said backrest.

24. The apparatus according to claim 23, wherein said planar portion is adapted to be removably attached to the upper back portion of said backrest by positioning said strap means over the top of said backrest and fastening said strap means to the front side of said backrest.

25. The apparatus according to claim 23, wherein said planar portion is adapted to be removably attached to the upper back portion of said backrest by positioning said strap means around the sides of said backrest and fastening said strap means together at the front side of said backrest.

26. The apparatus according to claim 23, wherein said backrest includes a headrest supported on the top of said backrest with a headrest support mechanism, and wherein said planar portion of said bracket means is adapted to be removably attached to the upper back portion of said backrest by fastening said strap means to said headrest support mechanism.

27. The apparatus according to claim 18, wherein said bracket means is a single elongated bar having generally an S-shaped cross-section, wherein said planar portion is disposed near the midpoint of said bar.

28. The apparatus according to claim 18, wherein said bracket means includes an anchor member having a plurality of opposite finger members protruding outwardly therefrom, wherein the outer ends of said finger members define said planar portion.

* * * * *